(12) United States Patent
Shim et al.

(10) Patent No.: US 12,427,752 B2
(45) Date of Patent: *Sep. 30, 2025

(54) METHOD TO FABRICATE A MACHINABLE CERAMIC MATRIX COMPOSITE

(71) Applicant: Rolls-Royce High Temperature Composites, Inc., Cypress, CA (US)

(72) Inventors: Sungbo Shim, Cypress, CA (US); Pathikumar Sellappan, Cypress, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,812

(22) Filed: Aug. 16, 2024

(65) Prior Publication Data

US 2024/0408855 A1 Dec. 12, 2024

Related U.S. Application Data

(63) Continuation of application No. 17/412,686, filed on Aug. 26, 2021, now Pat. No. 12,071,380.
(Continued)

(51) Int. Cl.
  *B32B 37/20* (2006.01)
  *B32B 18/00* (2006.01)

(52) U.S. Cl.
  CPC .............. *B32B 18/00* (2013.01); *B32B 37/20* (2013.01); *B32B 2262/105* (2013.01); *B32B 2305/026* (2013.01)

(58) Field of Classification Search
  CPC ... B32B 18/00; B32B 37/20; B32B 2262/105; B32B 2305/026; C04B 2235/5244;
(Continued)

(56) References Cited

U.S. PATENT DOCUMENTS

| | | | |
|---|---|---|---|
| 4,242,106 A | 12/1980 | Morelock | |
| 5,015,540 A | 5/1991 | Borom et al. | |

(Continued)

FOREIGN PATENT DOCUMENTS

| | | |
|---|---|---|
| DE | 102007063517 B3 | 1/2009 |
| EP | 1035089 B1 | 9/2003 |

(Continued)

OTHER PUBLICATIONS

"Ceramic matrix composite," wikipedia.org, retrieved from https://en.wikipedia.org/wiki/Ceramic_matrix_composite on Oct. 25, 2019, 12 pp.

(Continued)

*Primary Examiner* — Cynthia L Schaller
(74) *Attorney, Agent, or Firm* — Shumaker & Sieffert, P.A.

(57) ABSTRACT

A method to form a machinable ceramic matrix composite comprises forming a porous ceramic multilayer on a surface of a fiber preform. In one example, the porous ceramic multilayer comprises a gradient in porosity in a direction normal to the surface. In another example, the porous ceramic multilayer includes low-wettability particles having a high contact angle with molten silicon, where an amount of the low-wettability particles in the porous ceramic multilayer varies in a direction normal to the surface. After forming the multilayer, the fiber preform is infiltrated with a melt, and the melt is cooled to form a ceramic matrix composite with a surface coating thereon. An outer portion of the surface coating is machined to form a ceramic matrix composite having a machined surface with a predetermined surface finish and/or dimensional tolerance.

6 Claims, 4 Drawing Sheets

Related U.S. Application Data

(60) Provisional application No. 63/078,989, filed on Sep. 16, 2020.

(58) Field of Classification Search
CPC ........ C04B 2235/616; C04B 2237/365; C04B 2237/38; C04B 35/565; C04B 35/573; C04B 35/80
See application file for complete search history.

(56) References Cited

U.S. PATENT DOCUMENTS

| | | | |
|---|---|---|---|
| 5,840,221 A | 11/1998 | Lau et al. | |
| 5,952,100 A | 9/1999 | Corman et al. | |
| 6,165,600 A * | 12/2000 | Ivkovich, Jr. | B32B 18/00 428/218 |
| 6,245,424 B1 | 6/2001 | Lau et al. | |
| 6,403,158 B1 | 6/2002 | Corman | |
| 6,609,452 B1 | 8/2003 | McCormick et al. | |
| 6,820,334 B2 | 11/2004 | Kebbede et al. | |
| 6,855,428 B2 | 2/2005 | Lau et al. | |
| 7,378,362 B2 | 5/2008 | Nixon et al. | |
| 7,686,990 B2 | 3/2010 | Gray | |
| 7,842,335 B2 | 11/2010 | Skoog et al. | |
| 7,942,638 B2 | 5/2011 | Eichmann et al. | |
| 8,043,720 B2 | 10/2011 | Corman et al. | |
| 8,474,362 B1 | 7/2013 | Karandikar et al. | |
| 8,846,218 B2 | 9/2014 | Bouillon et al. | |
| 9,238,595 B2 | 1/2016 | Bouillon et al. | |
| 9,713,912 B2 | 7/2017 | Lee | |
| 10,676,403 B2 | 6/2020 | Oboodi et al. | |
| 11,198,651 B2 | 12/2021 | Shim et al. | |
| 2005/0158171 A1 | 7/2005 | Carper et al. | |
| 2005/0276931 A1 | 12/2005 | Che et al. | |
| 2006/0147622 A1 | 7/2006 | Gray | |
| 2006/0163773 A1 | 7/2006 | Gray | |
| 2007/0075455 A1 | 4/2007 | Marini et al. | |
| 2007/0092762 A1 | 4/2007 | Corman et al. | |
| 2011/0027556 A1 | 2/2011 | Kirby et al. | |
| 2011/0027578 A1 | 2/2011 | Kirby et al. | |
| 2011/0268577 A1 | 11/2011 | Bouillon et al. | |
| 2013/0009348 A1 | 1/2013 | Murata | |
| 2013/0122259 A1 | 5/2013 | Lee | |
| 2013/0157037 A1 | 6/2013 | Matsumoto | |
| 2013/0287941 A1 | 10/2013 | Gray | |
| 2014/0272274 A1 | 9/2014 | Lazur | |
| 2015/0004324 A1 | 1/2015 | Bouillon et al. | |
| 2015/0197456 A1 | 7/2015 | Oboodi et al. | |
| 2016/0101561 A1 | 4/2016 | Walston et al. | |
| 2016/0159066 A1 | 6/2016 | Landwehr et al. | |
| 2016/0214907 A1 | 7/2016 | Shim et al. | |
| 2016/0230570 A1 | 8/2016 | Harris et al. | |
| 2016/0279744 A1 | 9/2016 | Harris | |
| 2016/0326064 A1 | 11/2016 | Shim et al. | |
| 2016/0356163 A1 | 12/2016 | Freeman et al. | |
| 2017/0247787 A1 | 8/2017 | Saha et al. | |
| 2017/0313627 A1 | 11/2017 | Shim et al. | |
| 2017/0313629 A1 | 11/2017 | Shim et al. | |
| 2018/0305263 A1 | 10/2018 | Shim | |
| 2018/0346388 A1 | 12/2018 | Oboodi et al. | |
| 2019/0185384 A1 | 6/2019 | Shim et al. | |
| 2019/0256427 A1 | 8/2019 | Shim et al. | |
| 2019/0256983 A1 | 8/2019 | Joulia et al. | |
| 2022/0169574 A1 | 6/2022 | Shim et al. | |

FOREIGN PATENT DOCUMENTS

| | | |
|---|---|---|
| EP | 1636148 A2 | 3/2006 |
| EP | 1683771 A1 | 7/2006 |
| EP | 3050863 A1 | 8/2016 |
| EP | 3061736 A1 | 8/2016 |
| EP | 3135866 A1 | 3/2017 |
| EP | 3241817 A1 | 11/2017 |
| EP | 3392034 A1 | 10/2018 |
| FR | 3081156 A1 | 11/2019 |
| JP | 2000344582 A | 12/2000 |
| WO | 9824737 A1 | 6/1998 |

OTHER PUBLICATIONS

"DURAMAX Binders," The Dow Chemical Company, Form No. 233-01075-MM-0513, May 13, 2013, 5 pp.
Abramshe et al., "Effective Cleaning Methods and Best Practices of Synthetic Industrial Diamond," Mar. 1, 2007, rdmag.com, 8 pp.
Extended European Search Report from corresponding European Application No. 21195960.6 dated Feb. 10, 2022, 10 pp.
FR3081156A1 Machine Translation of Description (Year: 2023).
Prosecution History from U.S. Appl. No. 17/412,686, dated Dec. 27, 2023 through Apr. 26, 2024, 45 pp.
Response to Extended Search Report dated Feb. 10, 2022, from counterpart European Application No. 21195960.6 filed Sep. 14, 2022, 13 pp.
Communication pursuant to Article 94(3) EPC from counterpart European Application No. 21195960.6 dated Apr. 30, 2025, 5 pp.
Response to Communication pursuant to Article 94(3) EPC dated Apr. 30, 2025, from counterpart European Application No. 21195960.6 filed May 13, 2025, 54 pp.
Notice of Intent to Grant and Text Intended to Grant from counterpart European Application No. 21195960.6 dated Jun. 10, 2025, 57 pp.

* cited by examiner

US 12,427,752 B2

METHOD TO FABRICATE A MACHINABLE CERAMIC MATRIX COMPOSITE

RELATED APPLICATION

This application is a continuation of U.S. patent application Ser. No. 17/412,686, filed 26 Aug. 2021, which claims the benefit of U.S. Provisional Patent Application No. 63/078,989, filed 16 Sep. 2020, the entire content of each application is incorporated herein by reference.

TECHNICAL FIELD

The present disclosure relates generally to the fabrication of a ceramic matrix composite (CMC) and more particularly to fabrication of a machinable CMC.

BACKGROUND

Ceramic matrix composites, which include ceramic fibers embedded in a ceramic matrix, exhibit a combination of properties that make them promising candidates for industrial applications, such as gas turbine engines, that demand excellent thermal and mechanical properties along with low weight. A ceramic matrix composite that includes a silicon carbide matrix reinforced with silicon carbide fibers may be referred to as a silicon carbide/silicon carbide composite or SiC/SiC composite. Fabrication of SiC/SiC composites typically includes a melt infiltration step in which a SiC fiber preform is exposed to molten silicon, which is drawn into the (porous) fiber preform via capillary forces and reacts to form the SiC matrix. After melt infiltration and cooling, the densified ceramic matrix composite (CMC) may undergo a machining step to reach the desired surface smoothness and/or dimensional tolerances. However, machining may lead to exposure of CMC fibers and/or introduce flaws, making the CMC susceptible to accelerated structural degradation upon exposure to high temperature operating conditions. Furthermore, given the hardness of densified CMCs, machining can be a slow and difficult process that can reduce tool life. In addition, a thick environmental barrier coating (EBC) may be applied to the CMC, followed by machining, but the EBC coating is also susceptible to cracking during machining and the needed raw materials and processing may be costly. In some cases, machining may be carried out prior to melt infiltration while the SiC fiber preform is in the green state and is more readily machined, but typically a final machining step is required anyway after melt infiltration to ensure that the desired surface finish and/or dimensional tolerances are achieved.

BRIEF DESCRIPTION OF THE DRAWINGS

The embodiments may be better understood with reference to the following drawing(s) and description. The components in the figures are not necessarily to scale. Moreover, in the figures, like-referenced numerals designate corresponding parts throughout the different views.

DETAILED DESCRIPTION

A method of forming a machinable ceramic matrix composite is described in this disclosure. The method includes forming a porous ceramic multilayer on a surface of a fiber preform, followed by melt infiltration and machining steps. In one example, as described in reference to FIGS. 1A and 1B and 3A-3C, the porous ceramic multilayer comprises a gradient in porosity in a direction normal to the surface. In another example, as described in reference to FIGS. 2A and 2B and 4A-4C, the porous ceramic multilayer includes low-wettability particles having a high contact angle with molten silicon, where an amount of the low-wettability particles varies in a direction normal to the surface.

Figure 1A:
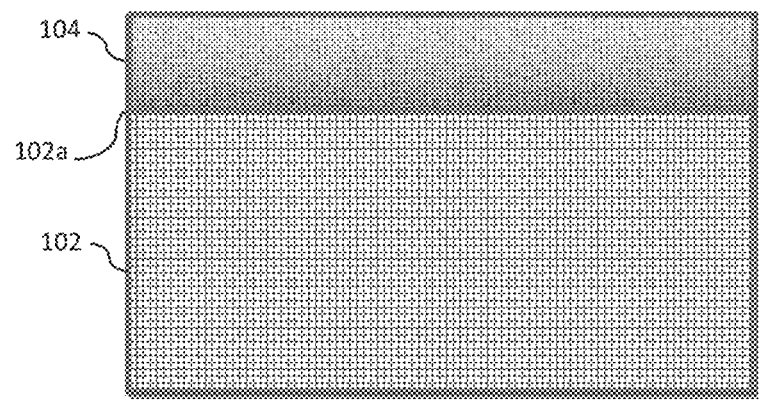
FIGS. 1A and 1B are cross-sectional schematics showing, respectively, a fiber preform with a porous ceramic multilayer thereon, where the porous ceramic multilayer includes a gradient in porosity, and a ceramic matrix composite (CMC) including a density gradient surface coating.

Referring first to FIG. 1A, the method may comprise forming a porous ceramic multilayer 104 on a surface 102a of a fiber preform 102, where the porous ceramic multilayer 104 comprises a gradient in porosity in a direction normal to the surface 102a. For example, the porosity of the porous ceramic multilayer 104 may increase in a direction away from the surface 102a. Typically, the fiber preform 102 is a slurry-infiltrated or impregnated fiber preform that has previously undergone slurry infiltration to deposit ceramic particles and optionally other particulate solids within interstices or pores of the fiber preform 102. The porous ceramic multilayer 104 may be fabricated from multiple layers of ceramic slurry or tape, as described below in reference to FIGS. 3A-3C. Thus, the porous ceramic multilayer 104 may have a porous structure defined by layered arrangements of particulate solids (e.g., ceramic particles), which may be bound together by van der Waals or other forces. The porous structure may include both open and closed pores. The gradient in porosity may be, more specifically, a gradient in volume fraction of porosity, where one or more outer layers of the porous ceramic multilayer 104 includes a higher volume fraction of porosity than one or more inner layers of the porous ceramic multilayer 104. The presence of larger-size pores and/or in an increased number of the pores may contribute to the higher volume fraction of porosity.

Figure 1B:
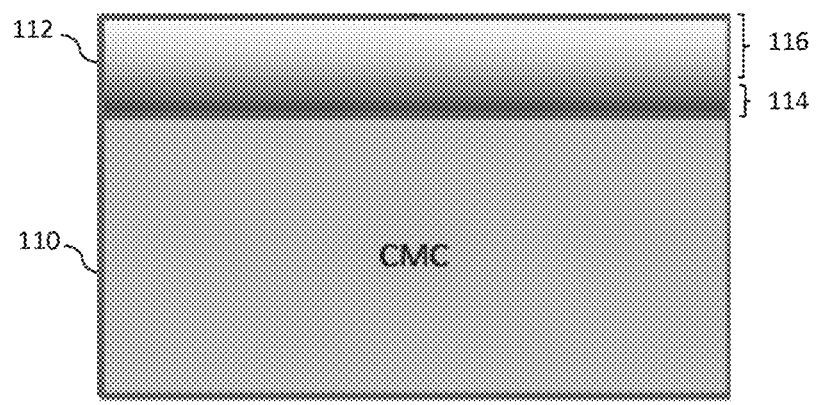

After forming the porous ceramic multilayer 104, the fiber preform 102 may be infiltrated with a melt and then cooled to form a ceramic matrix composite 110 having what may be described as a density-gradient surface coating 112 thereon, as illustrated in FIG. 1B. An outer portion 116 of the surface coating 112 has a reduced density compared to the inner portion 114 and thus is more readily machinable. Because melt infiltration is driven by capillary forces, the size of the pores in the porous ceramic multilayer 104 may influence or determine the partially densified structure of the inner and outer portions 114,116 of the surface coating 112. Advantageously, the machinable outer portion 116 may have a thickness in a range from about 0.4 mm to about 1.0 mm (about 15-40 mils). Typically, the more dense inner portion 114 has a thickness in a range from about 0.13 mm to about 0.25 mm (about 5-10 mils). The method may further include machining the outer portion 116 to form a ceramic matrix composite 110 having a predetermined surface finish and/or dimensional tolerance, as will be discussed further below.

Figure 2A:
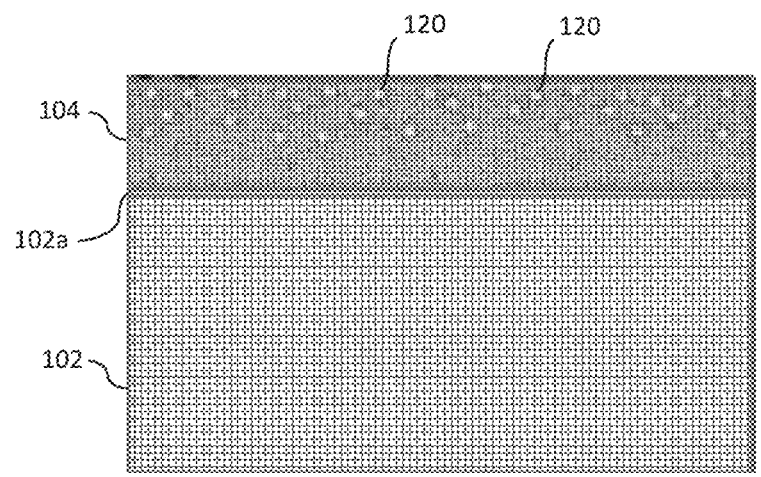
FIGS. 2A and 2B are cross-sectional schematics showing, respectively, a fiber preform with a porous ceramic multilayer thereon, where the porous ceramic multilayer includes low-wettability particles, and a CMC including a density gradient surface coating.

Referring now to FIG. 2A, the method may comprise forming a porous ceramic multilayer 104 on a surface 102a of a fiber preform 102, where the porous ceramic multilayer 104 includes low-wettability particles 120 having a high contact angle with molten silicon, such as boron nitride particles, aluminum nitride particles and/or silica particles. The phrase "high contact angle" with molten silicon may be understood to be a contact angle greater than or equal to 90°, and the contact angle may also be greater than or equal to 95°. As in the previous example, the fiber preform 102 is typically a slurry-infiltrated or impregnated fiber preform that has previously undergone slurry infiltration to deposit ceramic particles and optionally other particulate solids within interstices or pores of the fiber preform 102. Also, the porous ceramic multilayer 104 may have a porous structure defined by layered arrangements of particulate solids (e.g., ceramic particles and the low-wettability particles) and may be fabricated from multiple layers of ceramic slurry or tape, as will be discussed in references to FIGS. 4A-4C. In contrast to the previous example, however, the porous ceramic multilayer 104 does not necessarily include a gradient in porosity in a direction normal to the surface. Instead, the low-wettability particles 120 may help to control density during processing. In particular, because molten silicon is ineffective at wetting such particles, densification can be inhibited during melt infiltration. The porous ceramic multilayer 104 may beneficially include a gradient in the amount of the low-wettability particles 120 in a direction normal to the surface 102a. For example, the amount (e.g., volume fraction) of the low-wettability particles 120 may increase in a direction away from the surface 102a.

Figure 2B:
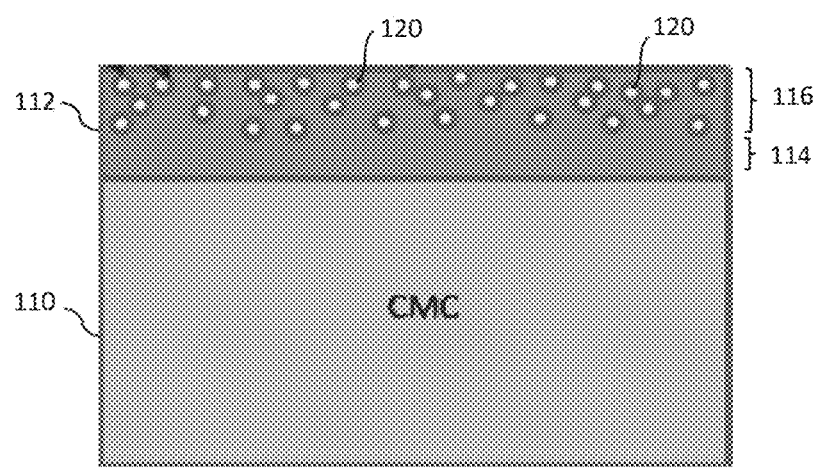

After forming the porous ceramic multilayer 104, the fiber preform 102 may be infiltrated with a melt and then cooled to form a ceramic matrix composite 110 having a density-gradient surface coating 112 thereon, as illustrated in FIG. 2B. Due to the presence of the low-wettability particles 120, an outer portion 116 of the surface coating 112 has a reduced density compared to the inner portion 114 and thus is more readily machinable. The low-wettability particles 120 may be easily removed during machining. Advantageously, the machinable outer portion 116 may have a thickness in a range from about 0.4 mm to about 1.0 mm (about 15-40 mils). Typically, the more dense inner portion 114 has a thickness in a range from about 0.13 mm to about 0.25 mm (about 5-10 mils). The method may further include machining the outer portion 116 to form a ceramic matrix composite 110 having a predetermined surface finish and/or dimensional tolerance, as will be discussed further below.

The ceramic matrix composite 110 shown in FIGS. 1B and 2B includes ceramic fibers in a ceramic matrix. The ceramic fibers typically comprise silicon carbide but may also or alternatively include silicon nitride, alumina, aluminosilicate or carbon, and the ceramic matrix typically comprises silicon carbide but may also or alternatively include silicon nitride, silicon nitrocarbide and/or other ceramics. The surface coating comprises silicon carbide and optionally other ceramics. The ceramic matrix composite may form part or all of a gas turbine engine component, such as a seal segment, shroud, blade or vane. The fiber preform 102 may comprise a three-dimensional framework of the ceramic fibers, which may be arranged in tows. The fiber preform 102 may be formed by laying up plies comprising tows of the ceramic fibers (e.g., arranged in a two- or three-dimensional weave), followed by infiltration with a slurry comprising silicon carbide and/or other ceramic particles and optionally reactive elements. Typically, the slurry-infiltrated fiber preform 102 comprises a loading level of particulate matter from about 40 vol. % to about 60 vol. %. Prior to slurry infiltration, one or more fiber coatings, such as an interface layer to provide a weak fiber-matrix interface and a matrix layer to rigidize the fiber preform, may be deposited on the ceramic fibers by chemical vapor infiltration or another deposition process known in the art.

During melt infiltration, the molten material infiltrated into the fiber preform 102, which is typically a slurry-infiltrated fiber preform as described above, may consist essentially of silicon (e.g., elemental silicon and any incidental impurities) or may comprise a silicon alloy (e.g., a silicon-rich alloy). Melt infiltration may be carried out at a temperature at or above the melting temperature of silicon or the silicon alloy which is infiltrated. Thus, the temperature for melt infiltration is typically in a range from about 1350° C. to about 1500° C. A suitable time duration for melt infiltration may be from 15 minutes to four hours, depending in part on the size and complexity of the ceramic matrix composite to be formed. A ceramic matrix is formed from the ceramic particles as well as ceramic reaction products created from reactions between the molten material and any other particulate solids (e.g., carbon particles, refractory metal particles) in the fiber preform. The surface coating 112 may include ceramic particles as well as ceramic reaction products from reactions between the molten material and any reactive elements/particles.

The porous ceramic multilayer 104 of FIG. 1A, which includes a porosity gradient in a direction normal to the surface 102a, may be formed by a ceramic slurry-based process or a ceramic tape-based process, as described below in reference to FIGS. 3A-3C. The ceramic slurry-based process is described first.

Figure 3A:
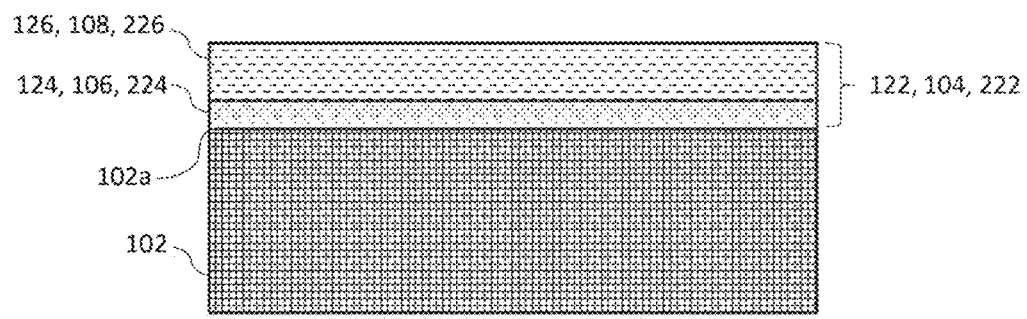
FIGS. 3A-3C are cross-sectional schematics that illustrate slurry-based and tape-based approaches to forming a porous ceramic multilayer on a fiber preform, where the porous ceramic multilayer includes a gradient in porosity, followed by melt infiltration and machining.

Referring to FIG. 3A, the slurry-based process of forming the porous ceramic multilayer of FIG. 1A may entail applying multiple ceramic slurry layers 122 to the surface 102a of the fiber preform 102, which is typically a slurry-infiltrated fiber preform as described above. For example, in the simplest case an inner slurry layer 124 may be applied to the surface 102a and an outer slurry layer 126 may be applied to the inner slurry layer 124, where each of the inner and outer slurry layers 124,126 comprises ceramic particles in a carrier liquid. The outer slurry layer 126 exhibits a carrier liquid volatility, particle volume fraction, and/or polymer content different from that of the inner slurry layer. During or after application of the inner and outer slurry layers 124,126, the carrier liquid is removed (e.g., by passive and/or active drying), leaving the ceramic particles and any other particulate solids attached to the surface, thereby forming inner and outer layers 106,108 of the porous ceramic multilayer 104, which includes a porosity gradient.

Figure 3B:
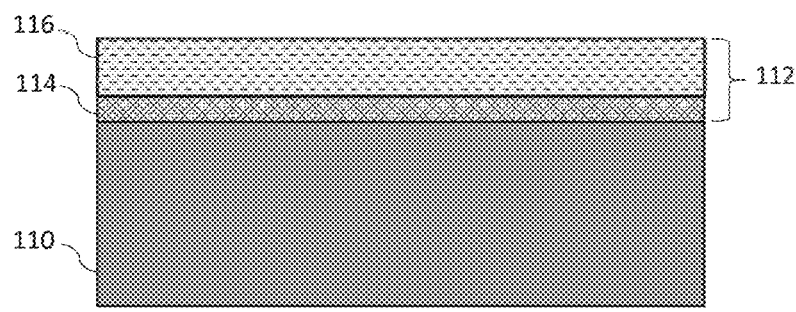

After forming the porous ceramic multilayer 104 from the multiple ceramic slurry layers 122, the fiber preform 102 may be infiltrated with molten silicon and then cooled to form a ceramic matrix composite 110 having a density-gradient surface coating 112 thereon, as shown schematically in FIG. 3B. Due to the porosity gradient in the porous ceramic multilayer 104, an outer portion 116 of the surface coating 112 has a reduced density compared to the inner portion 114 and thus is more readily machinable.

Figure 3C:
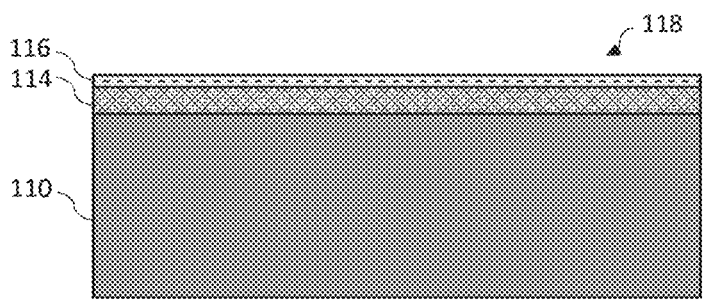

Referring to FIG. 3C, the method may further include machining the outer portion 116 to form a ceramic matrix composite 110 having a machined surface 118 with a predetermined surface finish and/or dimensional tolerance. The machining of the outer portion 116 may be carried out using a grinding tool, an abrasive slurry/pad, sandpaper, and/or another green machining tool or method known in the art.

The application of the multiple slurry layers 122 shown in FIG. 3A may comprise spraying, dip-coating, spin-coating and/or another deposition method. References to the multiple slurry layers 122 (or more simply, to "the slurry layers 122") are understood to encompass either or both of the inner and outer slurry layers 124,126. Typically, application of the slurry layers 122 is carried out under ambient conditions, such as at atmospheric pressure, in air, and/or at room temperature (20-25° C.). Active drying to remove the carrier liquid may be carried out at room temperature or at an elevated temperature (e.g., from about 30° C. to about 200° C.) in ambient conditions or in a controlled environment, such as under vacuum or in an inert gas atmosphere; passive drying may occur by evaporation during or after application of the slurry layers 122.

Each of the slurry layers 122 may be formed from ceramic (e.g., silicon carbide, silicon nitride, and/or silicon nitrocarbide) particles in a carrier liquid, which may be an aqueous liquid or a high-volatility liquid, as discussed below. The slurry layers 122 may include other particulate solids in addition to the ceramic particles, such as silicon particles, carbon particles and/or other types of reactive particles. The slurry layers 122 may further comprise small amounts of one or more polymers, such as a polymeric binder, dispersant and/or plasticizer, to aid in forming a stable slurry. The polymeric binder may comprise polyethylene glycol, an acrylate co-polymer, a latex co-polymer, and/or polyvinyl butyral, and the dispersant may comprise ammonium polyacrylate, polyvinyl butyral, a phosphate ester, polyethylene imine, and/or BYK® 110 (Byk USA, Wallingford, CT). The ceramic and other optional particulate solids employed for the slurry layers 122 typically have an average width or diameter in a range from about 0.5 micron to about 20 microns.

To control the volume fraction of porosity obtained in the outer and inner layers 106,108 of the porous ceramic multilayer 104, characteristics of each of the outer and inner slurry layers 124,126—such as carrier liquid volatility, volume fraction of particles, and/or polymer content—may be carefully selected. For example, the inventors have recognized a link between increased volatility of the carrier liquid and increased porosity in the deposited layer (e.g., outer layer 108). A high-volatility liquid may be understood to be a liquid having a vapor pressure, at 20-25° C., of at least about 4 kPa, and in some examples at least above 10 kPa. For comparison, water, which may be considered to be a low-volatility liquid, has a vapor pressure of about 2.4 kPa at 20-25° C. Experiments suggest that using a high-volatility liquid as the carrier liquid may lead to the appearance of relative large pores in the deposited layer due to rapid evaporation during application of the slurry. Consequently, the carrier liquid of the outer slurry layer 126, which upon drying becomes the outer layer 108 of the porous ceramic multilayer 104, where a high volume fraction of porosity is desired, may comprise a high-volatility liquid, such as isopropyl alcohol (4.4), ethyl alcohol (12.4), methyl alcohol (16.9), or acetone (30); the vapor pressure in kPa at 20-25° C. is given in parentheses. Typically, the carrier liquid of the inner slurry layer 124 may comprise an aqueous liquid, such as water (2.4), or another low-volatility liquid having a vapor pressure below 4 kPa, and preferably below 3 kPa.

Also or alternatively, to increase the porosity of the outer layer 108 of the porous ceramic multilayer 104 relative to the inner layer 106, the outer slurry layer 126 may have a lower solid loading (or volume fraction) of particles, or more particularly, a lower solid loading of ceramic particles than the inner slurry layer 124. A lower solid loading may allow for more space between the ceramic and/or other particles once deposited and dried. A suitable solid loading for the outer slurry layer 126 may be, for example, in a range from about 10 to about 25 vol. %, while the solid loading of the inner slurry layer 124 may lie in a range from about 35 to about 50 vol. %. Also or alternatively, a polymer content (e.g., amount of binder, dispersant and/or plasticizer) of the outer slurry layer 126 may be increased compared to the inner slurry layer 124 to promote a higher porosity in the outer layer 108 of the porous ceramic multilayer 104.

It is also contemplated, in addition to the ceramic particles, the outer slurry layer 126 may include low-wettability particles 120 (shown for example in FIG. 2A) having a high contact angle with molten silicon. The low-wettability particles may be selected from boron nitride particles, aluminum nitride particles, and/or silica particles, as described above. After application of the outer slurry layer 126 and drying, the outer layer 108 of the porous ceramic multilayer 104 may include the low-wettability particles in conjunction with the ceramic particles. Because molten silicon is ineffective at wetting such particles, densification can be inhibited during melt infiltration, leading to a further enhancement in the porosity of the outer portion 116 of the surface coating 112. The inner slurry layer 124, and consequently the inner layer 106 of the porous ceramic multilayer 104, may be completely devoid of the low-wettability particles, while the outer slurry layer 126 and the outer layer 108 of the porous ceramic multilayer 104 may include a significant amount of the low-wettability particles. For example, a volume ratio of ceramic (e.g., SiC) particles to the low-wettability particles in the outer slurry layer 126 and/or the outer layer 108 may be from about 90:10 to about 1:99. More typically, the ratio is from about 70:30 to about 30:70.

The simple schematics of FIGS. 3A-3C show a single inner slurry layer 124 and a single outer slurry layer 126 as part of the multiple slurry layers 122, but it is understood that there may be a plurality of the inner slurry layers 124 and/or a plurality of the outer slurry layers 126. Additional inner and/or outer slurry layers 124,126 may permit a gradient in porosity, particulate solids (particles), or some other characteristic to be obtained across the respective inner layers 106 or outer layers 108 of the porous ceramic multilayer 104. Additional inner and/or outer slurry layers 124,126 may also allow for control over the thickness of the resulting porous ceramic layer 104.

In one example, the plurality of outer slurry layers may comprise a gradient in the volume fraction of the particulate solids, or more specifically a gradient in the volume fraction of the ceramic particles, where the volume fraction decreases in a direction away from the surface. To achieve this, each successive outer slurry layer applied to an underlying inner or outer slurry layer may include a reduced volume fraction of particulate solids or ceramic particles compared to the underlying slurry layer. Also or alternatively, each successive outer slurry layer may include an increased polymer content (e.g., binder, dispersant, and/or plasticizer) compared to the underlying slurry layer. Consequently, the plurality of outer layers formed upon drying may exhibit a decreasing gradient in the volume fraction of particles in a direction away from the surface.

In another example, each successive outer slurry layer applied to an underlying inner or outer slurry layer may include an increased volume fraction of low-wettability particles compared to the underlying layer. Consequently, the plurality of outer layers formed upon drying may exhibit an increasing gradient in the volume fraction of low-wettability particles in a direction away from the surface. In both of these examples, after melt infiltration and cooling, the outer portion 116 of the surface coating 112 on the CMC may exhibit an increasing gradient in porosity and consequently enhanced machinability in a direction away from the surface. Each of the multiple inner and outer slurry layers may have any of the characteristics described above for individual inner and outer slurry layers.

A ceramic tape-based process of forming the porous ceramic multilayer 104 of FIG. 1A is now described, also in reference to FIGS. 3A-3C.

Referring again to FIG. 3A, the method may entail applying multiple ceramic tape layers 222 to the surface 102a of the fiber preform 102, which is typically a slurry-infiltrated fiber preform as described above. For example, in the simplest case an inner tape layer 224 may be applied to the surface 102a and an outer tape layer 226 may be applied to the inner tape layer 224, where each of the inner and outer tape layers 224,226 comprises a ceramic tape including ceramic particles in a polymeric binder. The outer tape layer 226 exhibits a particle volume fraction and/or polymer content different from that of the inner tape layer 224. Prior to applying the inner and outer tape layers 224,226 to the surface 102a and/or to an underlying tape layer 224, an adhesive may deposited (e.g., by spraying) to promote attachment of the ceramic tape. The adhesive may comprise the polymeric binder used in the ceramic tape. Typically, application of the tape layers 222 is carried out under ambient conditions, such as at atmospheric pressure, in air, and/or at room temperature (20-25° C.). After application, the inner and outer tape layers 224,226 may be laminated together and/or to the surface 102a to form the porous ceramic multilayer 104 having the porosity gradient. Lamination may entail vacuum bagging or another method known in the art. During or after lamination, excess binder may be removed (e.g., by pyrolysis) from the inner and outer tape layers 224,226.

After forming the porous ceramic multilayer 104 from the multiple ceramic tape layers 222, the fiber preform 102 may be infiltrated with molten silicon and then cooled to form a ceramic matrix composite 110 having the density-gradient surface coating 112 thereon, as shown schematically in FIG. 3B. An outer portion 116 of the surface coating 112 has a reduced density compared to the inner portion 114, and thus is more readily machinable.

Referring to FIG. 3C, the method may further include machining the outer portion 116 to form a ceramic matrix composite 110 having a machined surface 118 with a predetermined surface finish and/or dimensional tolerance. The machining of the outer portion 116 may be carried out using a grinding tool, an abrasive slurry/pad, sandpaper, and/or another green machining tool or method known in the art.

References below to the ceramic tape are understood to encompass the ceramic tape used for either or both of the inner and outer tape layers 224,226. The ceramic tape may be prepared by tape casting a typically water-based slurry comprising the ceramic particles and the polymeric binder onto a flexible polymeric sheet, followed by drying of the slurry and separation of the ceramic tape from the polymeric sheet. The ceramic tape may have a thickness in a range from about 50 µm to about 250 µm (about 2-10 mils). The ceramic particles may comprise silicon carbide particles, silicon nitride particles, and/or silicon nitrocarbide particles. The polymeric binder may comprise polyethylene glycol, an acrylate co-polymer, a latex co-polymer, and/or polyvinyl butyral. In addition to the ceramic particles and polymeric binder, the ceramic tape may further include a dispersant, such as ammonium polyacrylate, polyvinyl butyral, a phosphate ester, polyethylene imine, and/or BYK® 110 (Byk USA, Wallingford, CT), and/or a plasticizer. Like the inner and outer slurry layers discussed above, the ceramic tape may further comprise other particulate solids in addition to the ceramic particles, such as silicon particles, carbon particles and/or other types of reactive particles. The ceramic and other optional particulate solids employed for the inner and outer tape layers 224,226 typically have an average width or diameter in a range from about 0.5 micron to about 20 microns.

To control the volume fraction of porosity obtained in the outer and inner layers 106,108 of the porous ceramic multilayer 104, characteristics of each of the outer and inner tape layers 224,226—such as polymer content and volume fraction of particles—may be carefully selected. For example, the polymer content (e.g., amount of binder, dispersant and/or plasticizer) of the outer tape layer 226 may be higher than that of the inner tape layer 224 to promote an increased porosity in the outer layer 108 of the porous ceramic multilayer 104. A higher polymer content may lead to greater separation between the particulate solids in the outer layer 108 compared to the inner layer 106 of the porous ceramic multilayer 104, such that, upon melt infiltration, the outer portion 116 of the surface coating 112 on the CMC 110 has an increased porosity compared to the inner portion 114.

Also or alternatively, to increase the porosity of the outer layer 108 of the porous ceramic multilayer 104 relative to the inner layer 106, the outer tape layer 226 may have a lower loading of particulate solids, or more particularly, a lower loading of ceramic particles, than the inner tape layer 224. A lower solid loading may allow for more space between the ceramic and/or other particles across the tape layer 226. A suitable solid loading for the outer tape layer 226 may be, for example, in a range from about 40 vol. % to about 50 vol. %, while the solid loading of the inner tape layer 224 may lie in a range from about 50 vol. % to about 65 vol. %.

It is also contemplated, in addition to the ceramic particles, the outer tape layer 226 may include low-wettability particles 120 (shown for example in FIG. 2A) having a high contact angle with molten silicon. The low-wettability particles may be selected from the group consisting of boron nitride particles, aluminum nitride particles and silica particles, as described above. After application of the outer tape layer 226 and drying, the outer layer 108 of the porous ceramic multilayer 104 may include the low-wettability particles in conjunction with the ceramic particles. Because molten silicon is ineffective at wetting such particles, densification can be inhibited during melt infiltration, leading to increased porosity in the outer portion 116 of the resulting surface coating 112. The inner tape layer 224, and consequently the inner layer 106 of the porous ceramic multilayer 104, may be completely devoid of the low-wettability particles, while the outer tape layer 226 and the outer layer 108 of the porous ceramic multilayer 104 may include a significant amount of the low-wettability particles. For example, a volume ratio of ceramic (e.g., SiC) particles to the low-wettability particles in the outer tape layer 226 and/or the outer layer 108 may be from about 90:10 to about 1:99. More typically, the ratio is from about 70:30 to about 30:70.

The simple schematics of FIGS. 3A-3C show a single inner tape layer 224 and a single outer tape layer 226 as part of the multiple tape layers 222, but it is understood that there may be a plurality of the inner slurry layers 224 and/or a plurality of the outer slurry layers 226. Additional inner and/or outer slurry layers 224,226 may permit a gradient in porosity, particulate solids, or some other characteristic to be obtained across the respective inner layers 106 or outer layers 108 of the porous ceramic multilayer 104. Additional inner and/or outer tape layers 224,226 may also allow for control over the thickness of the resulting porous ceramic layer 104.

In one example, the plurality of outer tape layers may comprise a gradient in the volume fraction of the particulate solids, or more specifically a gradient in the volume fraction of the ceramic particles, where the volume fraction decreases in a direction away from the surface. To achieve this, each successive outer tape layer applied to an underlying inner or outer tape layer may include a reduced volume fraction of particulate solids or ceramic particles compared to the underlying tape layer. Also or alternatively, each successive outer tape layer may include an increased volume fraction of the polymeric binder compared to the underlying tape layer. Consequently, the plurality of outer layers formed upon lamination may exhibit a decreasing gradient in the volume fraction of particles (and/or an increasing gradient in the volume fraction of polymeric binder) in a direction away from the surface.

In another example, each successive outer tape layer applied to an underlying inner or outer tape layer may include an increased volume fraction of low-wettability particles compared to the underlying tape layer. Consequently, the plurality of outer layers formed upon lamination may exhibit an increasing gradient in the volume fraction of low-wettability particles in a direction away from the surface. In both of these examples, after melt infiltration and cooling, the outer portion 116 of the surface coating 112 on the CMC may exhibit an increasing gradient in porosity and consequently enhanced machinability in a direction away from the surface. Each of the multiple inner and outer tape layers may have any of the characteristics described above for individual inner and outer tape layers.

The porous ceramic multilayer 104 of FIG. 2A, which includes low-wettability particles as described above and may further exhibit a gradient in the amount of the low-wettability particles 120 in a direction normal to the surface 102a, may be formed by a ceramic slurry-based or tape-based process, as described below in reference to FIGS. 4A-4C. The ceramic slurry-based process is described first.

Figure 4A:
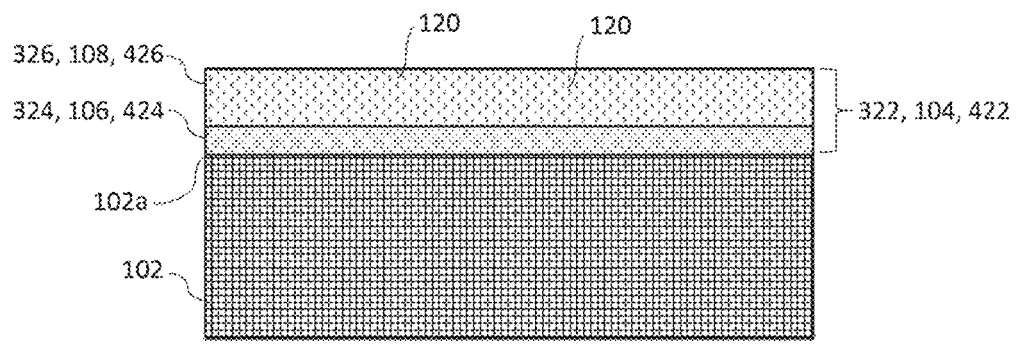
FIGS. 4A-4C are cross-sectional schematics that illustrate slurry-based and tape-based approaches to forming a porous ceramic multilayer on a fiber preform, where the porous ceramic multilayer includes low-wettability particles, followed by melt infiltration and machining.

Referring to FIG. 4A, the slurry-based process of forming the porous ceramic multilayer of FIG. 2A may entail applying multiple ceramic slurry layers 322 to the surface 102a of the fiber preform 102, which is typically a slurry-infiltrated fiber preform as described above, where each of the slurry layers 322 includes ceramic particles in a carrier liquid, and one or more outer slurry layers include low-wettability particles 120 having a high contact angle with molten silicon. For example, in the simplest case an inner slurry layer 324 may be applied to the surface 102a of the fiber preform 102 and an outer slurry layer 326 may be applied to the inner slurry layer 324, where the outer slurry layer 326 includes, in addition to the ceramic particles, the low-wettability particles 120. The inner slurry layer 324 and consequently the inner layer 106 of the porous ceramic multilayer 104 includes ceramic particles but may be completely devoid of the low-wettability particles. The outer slurry layer 326 and the outer layer 108 of the porous ceramic multilayer 104 may include a significant amount of the low-wettability particles 120. For example, a volume ratio of ceramic (e.g., SiC) particles to the low-wettability particles 120 in the outer slurry layer 326 and/or the outer layer 108 may be from about 90:10 to about 1:99. More typically, the ratio is from about 70:30 to about 30:70. Each of the inner and outer slurry layers 324,326 may optionally include other particulate solids, such as silicon particles, carbon particles and/or other types of reactive particles. During or after deposition of the inner and outer slurry layers 324,326, the carrier liquid may be removed (e.g., by passive and/or active drying), leaving the ceramic particles and the low-wettability particles 120 (and any other particulate solids) attached to the surface 102a, thereby forming the porous ceramic multilayer 104.

Figure 4B:
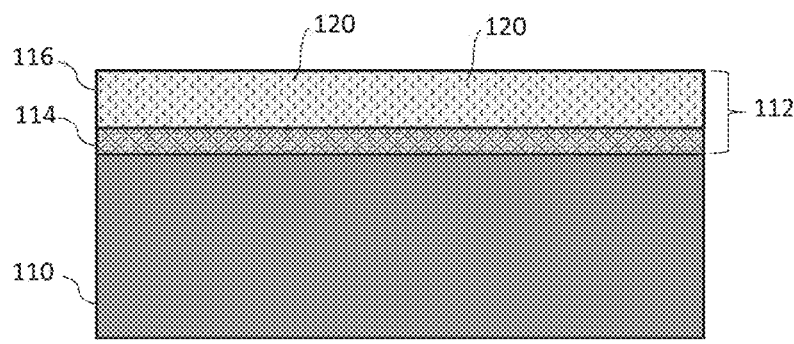

After forming the porous ceramic multilayer 104 from the multiple ceramic slurry layers 322, the fiber preform 102 may be infiltrated with a melt and then cooled to form a ceramic matrix composite 110 having a density-gradient surface coating 112 thereon, as shown schematically in FIG. 4B. An outer portion 116 of the surface coating 112 has a reduced density compared to an inner portion 114, and thus is more readily machinable. The outer portion 116 also includes the low-wettability particles 120 incorporated into the outer layer 108 of the porous ceramic multilayer 104, but the particles 120 may be easily removed during machining.

Figure 4C:
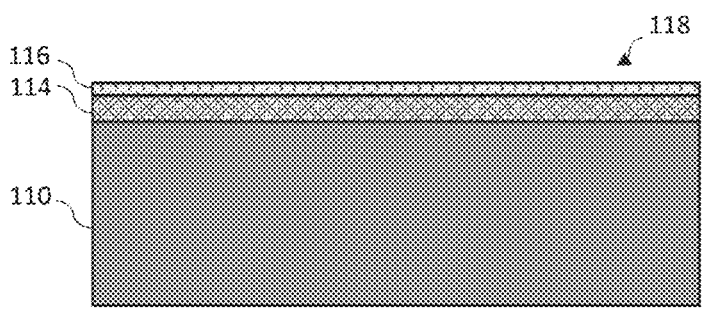

Referring to FIG. 4C, the method may further include machining the outer portion 116 to form a ceramic matrix composite 110 having a machined surface 118 with a predetermined surface finish and/or dimensional tolerance. The machining of the outer portion 116 may be carried out using a grinding tool, an abrasive slurry/pad, sandpaper, and/or another green machining tool or method known in the art.

The inner and outer slurry layers 324,326 shown in FIG. 4A may be applied by spraying, dip-coating, spin-coating and/or another deposition method, and may undergo passive or active drying as described above. In addition, the inner and outer slurry layers 324,326 may have any of the characteristics and/or undergo any of the processing modifications of the slurry layers 122,124,126 described above, such as differences in carrier liquid volatility and/or volume fraction of particles.

In some cases, as in the preceding examples, it may be beneficial to apply more than one of the inner slurry layers 324 to the surface 102a prior to applying the outer slurry layer 326; also or alternatively, more than one of the outer slurry layers 326 may be applied to the inner slurry layer(s) 324. Additional inner and/or outer slurry layers 324,326 may allow for control over the thickness of the resulting porous ceramic layer 104. Also or alternatively, application of a plurality of the inner slurry layers 324 and/or a plurality of the outer slurry layers 326 may permit a gradient in low-wettability particle volume fraction, porosity, or some other characteristic to be obtained across the respective inner layers 106 or outer layers 108 of the porous ceramic multilayer 104. For example, each successive outer slurry layer applied to an underlying inner or outer slurry layer may include an increased volume fraction of the low-wettability particles 120 compared to the underlying layer. Consequently, the plurality of outer layers formed upon drying may exhibit an increasing gradient in the volume fraction of low-wettability particles 120 in a direction away from the surface. Since the low-wettability particles can impede densification during melt infiltration, the outer portion 116 of the surface coating 112 on the CMC may also exhibit increased porosity and consequently enhanced machinability in a direction away from the surface. Each of the multiple inner and outer slurry layers may have any of the characteristics described in this disclosure for individual inner and outer slurry layers.

The ceramic tape-based process of forming the porous ceramic multilayer 104 of FIG. 2A is now described, also in reference to FIGS. 4A-4B.

Referring again to FIG. 4A, the method may entail applying multiple ceramic tape layers 422 to the surface 102a of the fiber preform 102, which is typically a slurry-infiltrated fiber preform as described above. For example, in the simplest case an inner tape layer 424 may be applied to the surface 102a and an outer tape layer 426 may be applied to the inner tape layer 424, where each of the inner and outer tape layers 424,426 comprises a ceramic tape including ceramic particles in a polymeric binder. In this example, the outer tape layer 426 further includes low-wettability particles 120 having a high contact angle with molten silicon. The inner tape layer 424, and consequently the inner layer 106 of the porous ceramic multilayer 104, includes the ceramic particles, but may be completely devoid of the low-wettability particles 120. The outer tape layer 426 and thus the outer layer 108 of the porous ceramic multilayer 104 may include a significant amount of the low-wettability particles 120. For example, a volume ratio of ceramic (e.g., SiC) particles to the low-wettability particles 120 in the outer tape layer 426 and/or the outer layer 108 may be from about 90:10 to about 1:99. More typically, the ratio is from about 70:30 to about 30:70. Each of the inner and outer tape layers 424,426 may optionally include other particulate solids, such as silicon particles, carbon particles and/or other types of reactive particles. Prior to applying the inner and outer tape layers 424,426 to the surface and/or to an underlying tape layer, an adhesive may deposited (e.g., by spraying) to promote attachment of the ceramic tape. The adhesive may comprise the polymeric binder used in the ceramic tape. Typically, application of the tape layers 422 is carried out under ambient conditions, such as at atmospheric pressure, in air, and/or at room temperature (20-25° C.). After application, the inner and outer tape layers 424,426 may be laminated together and/or to the surface 102a to form the porous ceramic multilayer 104.

After forming the porous ceramic multilayer 104 from the multiple ceramic tape layers 422, the fiber preform 102 may be infiltrated with molten silicon and then cooled to form a ceramic matrix composite 110 having the density-gradient surface coating 112 thereon, as shown schematically in FIG. 4B. An outer portion 116 of the surface coating 112 has a reduced density compared to an inner portion 114, and thus is more readily machinable. The outer portion 116 also includes the low-wettability particles 120 incorporated into the outer layer 108 of the porous ceramic multilayer 104, but the particles 120 may be easily removed during machining.

Referring to FIG. 4C, the method may further include machining the outer portion 116 to form a ceramic matrix composite 110 having a machined surface 118 with a predetermined surface finish and/or dimensional tolerance. The machining of the outer portion 116 may be carried out using a grinding tool, an abrasive slurry/pad, sandpaper, and/or another green machining tool or method known in the art.

The ceramic tape employed to form the inner and outer tape layers 424,426 may have any of the characteristics and/or undergo any of the processing modifications described above for the multiple tape layers 222, such as differences in polymer content and/or volume fraction of particles.

In some cases, as described above, it may be beneficial to apply more than one of the inner tape layers 424 to the surface 102a prior to applying the outer tape layer 426; also or alternatively, more than one of the outer tape layers 426 may be applied to the inner tape layer(s) 424. Additional inner and/or outer tape layers 424,426 may allow for control over the thickness of the resulting porous ceramic layer 104. Also or alternatively, application of a plurality of the inner tape layers 424, or a plurality of the outer tape layers 426, may permit a gradient in low-wettability particle volume fraction, porosity, or some other characteristic to be obtained across the respective inner layers 106 or outer layers 108 of the porous ceramic multilayer 104. For example, each successive outer tape layer applied to an underlying inner or outer tape layer may include an increased volume fraction of low-wettability particles compared to the underlying layer. Consequently, the plurality of outer layers formed upon lamination may exhibit an increasing gradient in the volume fraction of the low-wettability particles 120 in a direction away from the surface. Since the low-wettability particles can impede densification during melt infiltration, the outer portion 116 of the surface coating 112 on the CMC may exhibit an increasing gradient in porosity and consequently enhanced machinability in a direction away from the surface. Each of the multiple inner and outer tape layers may have any of the characteristics described in this disclosure for individual inner and outer tape layers.

A gas turbine engine component comprising a ceramic matrix composite having a predetermined surface finish and/or dimensional tolerance may be formed by any of the above-described exemplary methods.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method to form a ceramic matrix composite having a predetermined surface finish and/or dimensional tolerance, the method comprising: forming a porous ceramic multilayer on a surface of a fiber preform, typically a slurry-infiltrated fiber preform, the porous ceramic multilayer comprising a gradient in porosity in a direction normal to the surface; after forming the porous ceramic multilayer, infiltrating the fiber preform with a melt; cooling the melt to form a ceramic matrix composite with a surface coating thereon, an outer portion of the surface coating being more readily machinable than an inner portion of the surface coating; and machining the outer portion to form a ceramic matrix composite having a machined surface with a predetermined surface finish and/or dimensional tolerance.

A second aspect relates to the method of the first aspect, wherein the porosity of the porous ceramic multilayer increases in a direction away from the surface.

A third aspect relates to the method of the first or second aspect, wherein the ceramic matrix composite comprises silicon carbide fibers in a matrix comprising silicon carbide, and wherein the surface coating comprises silicon carbide.

A fourth aspect relates to the method of any preceding aspect, wherein forming the porous ceramic multilayer comprises applying multiple slurry layers to the surface.

A fifth aspect relates to the method of the fourth aspect, wherein applying the multiple slurry layers comprises: applying an inner slurry layer to the surface and applying an outer slurry layer to the inner slurry layer, each of the inner and outer slurry layers comprising ceramic particles in a carrier liquid, wherein a carrier liquid volatility, a particle volume fraction, and/or a polymer content of the inner and outer slurry layers are different; and removing the carrier liquid from the inner and outer slurry layers by passive and/or active drying, thereby forming the porous ceramic multilayer comprising the gradient in porosity.

A sixth aspect relates to the method of the fifth aspect, wherein the carrier liquid of the inner slurry layer comprises an aqueous liquid, and wherein the carrier liquid of the outer slurry layer comprises a high-volatility liquid having a vapor pressure at of at least about 4 kPa at 20-25° C.

A seventh aspect relates to the method of the fifth or sixth aspect, wherein the outer slurry layer contains the ceramic particles at a volume fraction lower than that of the inner slurry layer.

A eighth aspect relates to the method of any of the fifth through seventh aspects, wherein the outer slurry layer has a polymer content higher than that of the inner slurry layer.

A ninth aspect relates to the method of any of the fifth through eighth aspects, wherein a plurality of the outer slurry layers are applied to the inner slurry layer, each successive outer slurry layer comprising a reduced volume fraction of ceramic particles and/or an increased polymer content compared to an underlying slurry layer.

A tenth aspect relates to the method of any of the fifth through ninth aspects, wherein application of the inner and outer slurry layers comprises spray coating, dip coating or spin coating.

An eleventh aspect relates to the method of any preceding aspect, wherein forming the porous ceramic multilayer comprises applying multiple layers of a ceramic tape to the surface.

A twelfth aspect relates to the method of the eleventh aspect, wherein applying multiple layers of a ceramic tape to the surface comprises: applying an inner tape layer to the surface and applying an outer tape layer to the inner tape layer, each of the inner and outer tape layers comprising a ceramic tape including ceramic particles in a polymeric binder, wherein a particle volume fraction and/or polymer content of the inner and outer tape layers are different, and laminating the inner and outer tape layers to the surface, thereby forming the porous ceramic multilayer comprising the gradient in porosity.

A thirteenth aspect relates to the method of the twelfth aspect, wherein the outer tape layer contains the ceramic particles at a volume fraction lower than that of the inner tape layer.

A fourteenth aspect relates to the method of the twelfth or thirteenth aspect, wherein the outer tape layer has a polymer content higher than that of the inner tape layer.

A fifteenth aspect relates to the method of any of the twelfth through the fourteenth aspects, wherein a plurality of the outer tape layers are applied to the inner tape layer, each successive outer tape layer comprising a reduced volume fraction of ceramic particles and/or an increased polymer content compared to an underlying tape layer.

A sixteenth aspect relates to a method to form a ceramic matrix composite having a predetermined surface finish and/or dimensional tolerance, the method comprising: forming a porous ceramic multilayer on a surface of a fiber preform, the porous ceramic multilayer including low-wettability particles having a high contact angle with molten silicon, an amount of the low-wettability particles in the porous ceramic multilayer varying in a direction normal to the surface; after forming the porous ceramic multilayer, infiltrating the fiber preform with a melt; cooling the melt to form a ceramic matrix composite with a surface coating thereon, an outer portion of the surface coating being more readily machinable than an inner portion of the surface coating; and machining the outer portion to form a ceramic matrix composite having a surface including a predetermined surface finish and/or dimensional tolerance.

A seventeenth aspect relates to the method of the sixteenth aspect, wherein the low-wettability particles are selected from the group consisting of boron nitride, aluminum nitride and silica.

An eighteenth aspect relates to the method of the sixteenth or seventeenth aspect, wherein forming the porous ceramic multilayer comprises applying multiple slurry layers to the surface.

A nineteenth aspect relates to the method of any of the sixteenth through the eighteenth aspects, wherein forming the porous ceramic multilayer comprises applying multiple tape layers to the surface.

A twentieth aspect relates to a gas turbine engine component comprising a ceramic matrix composite having a predetermined surface finish and/or dimensional tolerance formed by the method of any preceding aspect.

In addition to the features mentioned in each of the independent aspects enumerated above, some examples may show, alone or in combination, the optional features mentioned in the dependent aspects and/or as disclosed in the description above and shown in the figures.

What is claimed is:

1. A method to form a ceramic matrix composite having a predetermined surface finish and/or dimensional tolerance, the method comprising:
   forming a porous ceramic multilayer on a surface of a fiber preform, the porous ceramic multilayer comprising a gradient in porosity in a direction normal to the surface, wherein the porosity increases in a direction away from the surface, wherein forming the porous ceramic multilayer comprises applying multiple layers of a ceramic tape to the surface by at least:
   applying an inner tape layer to the surface and applying an outer tape layer to the inner tape layer, each of the inner and outer tape layers comprising a ceramic tape including ceramic particles in a polymeric binder, wherein a particle volume fraction and/or polymer content of the inner and outer tape layers are different; and
   laminating the inner and outer tape layers to the surface, thereby forming the porous ceramic multilayer comprising the gradient in porosity;
   after forming the porous ceramic multilayer, infiltrating the fiber preform with a melt;
   cooling the melt to form a ceramic matrix composite with a surface coating exhibiting an increasing gradient in porosity in the direction away from the surface and further having a reduced density compared to an inner portion of the surface coating, an outer portion of the surface coating thus being more readily machinable than the inner portion of the surface coating; and machining the outer portion to form a ceramic matrix composite having a machined surface with a predetermined surface finish and/or dimensional tolerance.

2. The method of claim 1, wherein the outer tape layer has a polymer content higher than that of the inner tape layer.

3. The method of claim 1, wherein the ceramic matrix composite comprises silicon carbide fibers in a matrix comprising silicon carbide, and wherein the surface coating comprises silicon carbide.

4. The method of claim 1, wherein the outer tape layer contains the ceramic particles at a volume fraction lower than that of the inner tape layer.

5. The method of claim 1, wherein a plurality of outer tape layers are applied to the inner tape layer, each successive outer tape layer comprising a reduced volume of ceramic particles and/or an increased polymer content compared to an underlying tape layer.

6. A gas turbine engine component comprising a ceramic matrix composite having a predetermined surface finish and/or a dimensional tolerance formed by the method of claim 1.

* * * * *